(12) United States Patent
Schlag

(10) Patent No.: US 8,308,017 B2
(45) Date of Patent: Nov. 13, 2012

(54) COMPOSITE MATERIAL WITH FIBERS WITH DIFFERENT STIFFNESS FOR OPTIMUM STRESS USAGE

(75) Inventor: Harald Schlag, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 1312 days.

(21) Appl. No.: 11/677,781

(22) Filed: Feb. 22, 2007

(65) Prior Publication Data

US 2008/0201932 A1 Aug. 28, 2008

(51) Int. Cl.
*F17C 1/06* (2006.01)

(52) U.S. Cl. .................... 220/588; 220/586; 220/589

(58) Field of Classification Search .......... 220/588, 220/592, 589, 628, 605, 586; 29/452; 156/161
See application file for complete search history.

(56) References Cited

U.S. PATENT DOCUMENTS

| | | | |
|---|---|---|---|
| 3,282,757 A | | 11/1966 | Brussee |
| 3,512,675 A | * | 5/1970 | Pennell ........................ 220/586 |
| 4,438,858 A | | 3/1984 | Grover |
| 5,763,035 A | * | 6/1998 | Andre De La Porte et al. ........................ 428/36.91 |
| 6,171,423 B1 | * | 1/2001 | Murphy et al. .............. 156/172 |
| 6,651,307 B2 | | 11/2003 | Portmann |
| 2004/0040969 A1 | * | 3/2004 | DeLay et al. ................ 220/586 |
| 2004/0045970 A1 | * | 3/2004 | Debecker et al. ............ 220/586 |

* cited by examiner

*Primary Examiner* — Anthony Stashick
*Assistant Examiner* — Jeffrey Allen
(74) *Attorney, Agent, or Firm* — Fraser Clemens Martin & Miller LLC; J. Douglas Miller

(57) ABSTRACT

A pressure vessel is provided including a liner forming a cavity and having an inner surface and an outer surface, and a composite wrap including a plurality of composite layers disposed adjacent to the outer surface. The composite wrap has a desired strain modulus gradient across a thickness of the composite wrap. Also provided is a method for producing the pressure vessel.

9 Claims, 1 Drawing Sheet

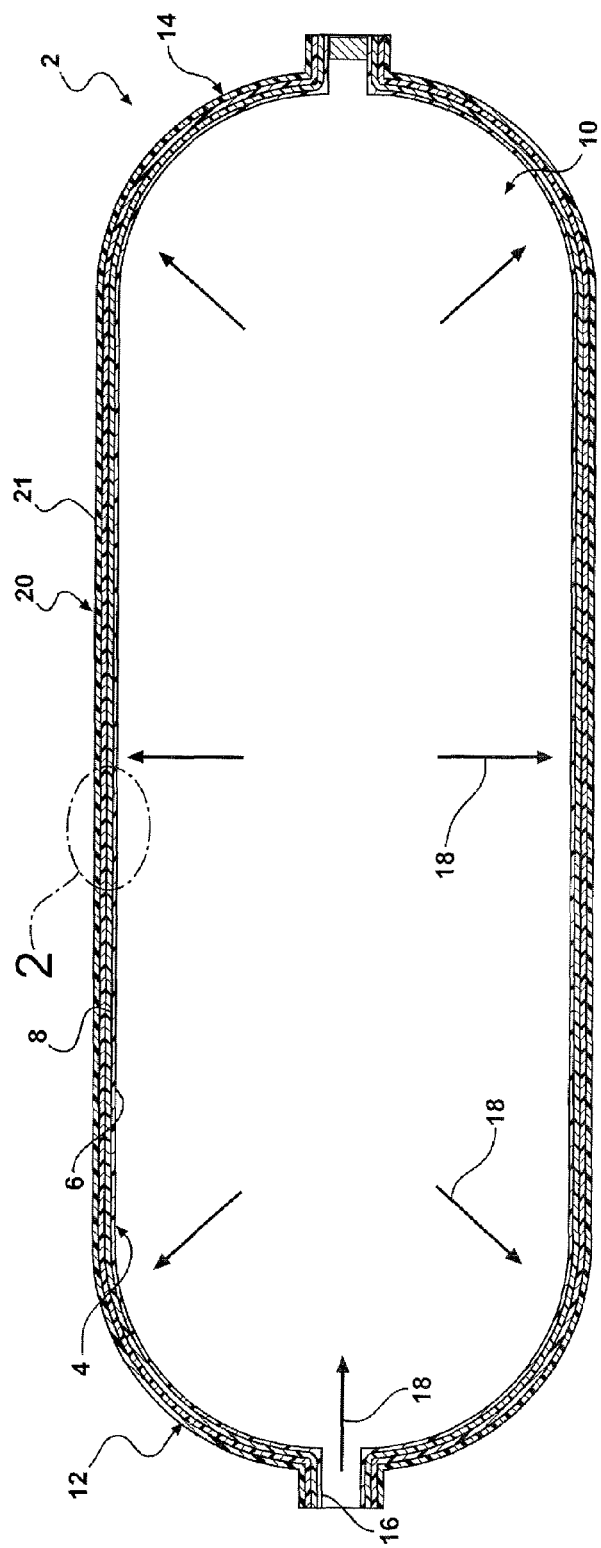
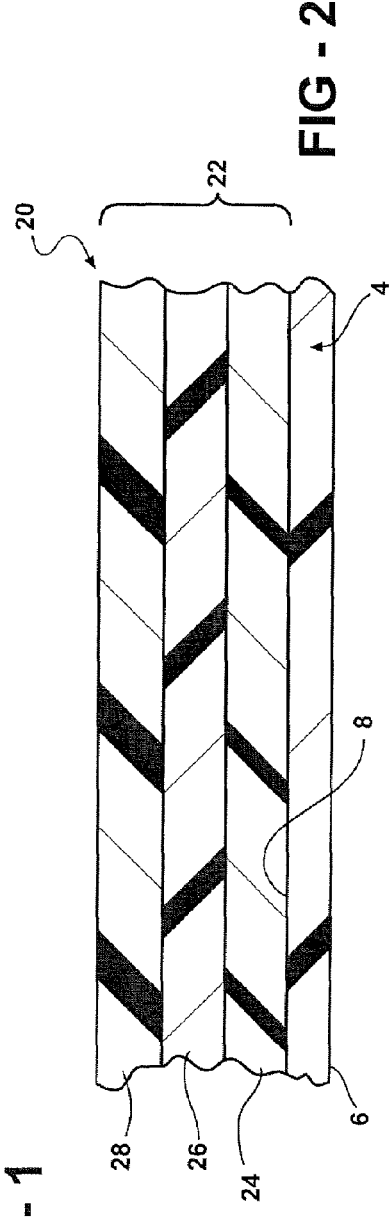
FIG - 1
FIG - 2

COMPOSITE MATERIAL WITH FIBERS WITH DIFFERENT STIFFNESS FOR OPTIMUM STRESS USAGE

FIELD OF THE INVENTION

The present disclosure relates to high pressure storage vessels and more particularly to high pressure vessels for fuel cell powered vehicles.

BACKGROUND OF THE INVENTION

Fuel cell power systems have been proposed as a clean, efficient and environmentally responsible power source for electric vehicles and various other applications. One type of fuel cell power system employs use of a proton exchange membrane (PEM) to catalytically facilitate reaction of fuels (such as hydrogen) and oxidants (such as air or oxygen) into electricity. Typically, the fuel cell power system has more than one fuel cell that includes an anode and a cathode with the PEM therebetween. The anode receives the hydrogen gas and the cathode receives the oxygen. The hydrogen gas is ionized in the anode to generate free hydrogen ions and electrons. The hydrogen ions pass through the electrolyte to the cathode. The hydrogen ions react with the oxygen and the electrons in the cathode to generate water as a by-product. The electrons from the anode cannot pass through the PEM, and are instead directed through a load to perform work before being sent to the cathode. The work acts to operate the vehicle. Many fuels cells are combined in a fuel cell stack to generate the desired power.

The fuel cell power system can include a processor that converts a liquid fuel, such as alcohols (e.g., methanol or ethanol), hydrocarbons (e.g., gasoline), and/or mixtures thereof, such as blends of ethanol/methanol and gasoline, to the hydrogen gas for the fuel cell stack. Such liquid fuels are easy to store on the vehicle. Further, there is a nationwide infrastructure for supplying the liquid fuels. Gaseous hydrocarbons, such as methane, propane, natural gas, LPG, etc., are also suitable fuels for both vehicle and non-vehicle fuel cell applications. Various reformers or processors are known in the art for converting the liquid fuel to gaseous hydrogen suitable for the fuel cell.

Alternatively, the hydrogen gas can be processed separate from the vehicle and stored at a filling station and the like. The hydrogen gas is transferred from the filling station to a high pressure vessel or container on the vehicle to supply the desired hydrogen gas to the fuel cell engine as needed. The high pressure vessels are typically classified into one of four types: a Type I vessel having an all-metal construction; a Type II having a metal-lined construction with a fiber hoop wrap for reinforcement; a Type III having a metal-lined construction with a complete fiber reinforcement wrap; and a Type IV having a plastic-lined construction with a complete fiber reinforcement wrap.

Tensile strains on the winding reinforcement wrap of the Type II, Type III, and Type IV high pressure vessel are caused by a pressure of a fluid contained within the pressure vessel. However, the reinforcement wrap is typically not loaded to a maximum tensile strength across the thickness of the wrap due to a phenomenon known as the "thick wall effect." For reinforcement wraps of conventional wall thickness, the thick wall effect states that a strain gradient is observed through the thickness of the wall. The strain gradient is typically characterized by a strain at an outer layer being lower than a strain at an inner layer.

It has been shown that an initial rupture at the inner layer of the fiber reinforcement wrap results in the outer layers of the reinforcement wrap becoming overloaded. The remaining load capacity provided by the outer layers normally cannot compensate for a rupture in the inner layers. Thus, the strength of the composite wrap is limited by the strength of the inner layers, and the remaining reinforcement wrap is not fully utilized in known pressure vessels.

U.S. Pat. No. 4,438,858 to Grover, incorporated herein by referenced in its entirety, states that an important parameter in controlling the strain gradient is a transverse or radial stiffness of the composite material. The transverse stiffness is influenced by a wind angle of the vessel, as well as any delamination or other defects induced during fabrication.

Also disclosed in U.S. Pat. No. 6,651,307 to Portmann, incorporated herein by reference in its entirety, is a fiber-reinforced pressure vessel having a composite layer applied over a liner to increase the strength of the vessel. The fibers wrapped about the liner act in tension when the vessel is pressurized. It is known according to Portmann to pre-stress the liner and fiber wrap to increase the vessel's structural characteristics under pressure.

There is a continuing need for a high pressure vessel having a more even distribution of stress across a thickness of a fiber reinforcement wrap. Desirably, the utilization of the fiber reinforcement wrap is optimized and the employment of material is minimized, thereby minimizing a weight of the pressure vessel.

SUMMARY OF THE INVENTION

In concordance with the instant disclosure, a pressure vessel having a substantially even distribution of stress across a thickness of a fiber reinforcement wrap, allowing for a lighter pressure vessel, is surprisingly discovered.

In a first embodiment, a pressure vessel is provided comprising a liner forming a cavity and having an inner surface and an outer surface. The pressure vessel includes a composite wrap disposed adjacent to the outer surface. The composite wrap includes a plurality of composite layers and has a strain modulus gradient across a thickness thereof.

In a second embodiment, the plurality of composite layers includes a first composite layer and a second composite layer. The first composite layer is disposed between the outer surface of the liner and the second composite layer. The first composite layer also exhibits a lower strain modulus than the second composite layer. The composite wrap of the pressure vessel is adapted to have a substantially uniform stress distribution across the thickness of the composite wrap when a pressure is applied to the inner surface of the liner.

In a further embodiment, a method for manufacturing the pressure vessel is provided. The method comprises the steps of: providing a liner forming a cavity and having an outer surface; providing a plurality of composite wrap layers, each of the composite wrap layers having a different strain modulus; and wrapping the outer surface of the liner with a plurality of composite wrap layers to form a composite wrap having a modulus gradient. Thus, a pressure vessel that militates against a thick wall effect when the cavity is pressurized is manufactured.

DRAWINGS

The above, as well as other advantages of the present disclosure, will become readily apparent to those skilled in the art from the following detailed description, particularly when considered in the light of the drawings described hereafter.

FIG. 1 is a side cross-sectional view of a pressure vessel according to the present disclosure; and FIG. 2 is an enlarged, fragmentary cross-sectional view of a wall of the pressure vessel depicted in FIG. 1.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts a cross-sectional view of a pressure vessel 2 according to one embodiment of the present invention. The pressure vessel 2 is generally cylindrical in shape to provide a desired integrity, although it should be appreciated that other shapes may also be used. It should be further understood that the pressure vessel 2 can be, in particular embodiments, a Type II, Type III, or Type IV pressure vessel. Other pressure vessels 2 employing a composite fiber wrap can also be used as desired.

The pressure vessel 2 includes a liner 4 having an inner surface 6 and an outer surface 8. The liner 4 forms a cavity 10 which is defined by the inner surface 6 of the liner 4. It should be understood that the liner 4 is a barrier that inhibits a permeation of a fluid (not shown) from the pressure vessel 2. The liner 4 material is durable in a range of operating temperatures experienced by the pressure vessel 2 while in service. A thickness of the liner 4 is typically minimized to maintain a pressure vessel 2 that is light-weight. As an illustrative example, the liner 4 thickness can be less than about 10 mm, and in particular embodiments less than about 5 mm. Other thicknesses can be used as desired.

The liner 4 is typically formed from a metal, a polymeric material, or a composite material. In one embodiment, the liner 4 is formed from a metal, for example steel, aluminum, copper, zinc, titanium or alloys thereof. In particular embodiments the liner 4 is formed from a polymeric material, for example a thermoplastic. Non-limiting examples of thermoplastic materials suitable for the liner 4 include polyethylenes, polypropylenes, polybutylene terephthalates, polyethylene terephthalates, nylons, polyvinyl chlorides, celluloses, vinyl chloride copolymers, polyimides, and combinations thereof. In one embodiment, a suitable thermoplastic material includes high density polyethylene (HDPE). One skilled in the art should appreciate that other materials may also be used to form the liner 4 of the present disclosure.

The pressure vessel 2 also has a first end 12 and a second end 14. The first end 12 is configured to receive an adapter (not shown) and forms a passage 16 through the liner 4. The passage 16 is in communication with the vessel cavity 10. In particular embodiments, the passage 16 is threaded to receive the adapter. The pressure vessel 2 can also include end fittings (not shown) that can be received at the second end 14 of the pressure vessel 2. The adapter and end fittings are typically formed as a structure that houses various components, including valves, pressure regulators, piping connectors, excess flow limiters, pressure relief devices, etc. (not shown). These additional components allow the pressure vessel 2 to be charged with a compressed fluid or fuel 18, for example hydrogen gas, and allow the compressed fuel 18 to be discharged from the pressure vessel 2 at or near ambient pressure, or a higher pressure if desired, to a fuel cell system (not shown). A suitable adhesive (not shown), sealing ring (not shown), or the like is also typically employed to seal the liner 4, the adapter, and end fittings for retention of the compressed fuel 18.

As is shown in FIGS. 1 and 2, a composite wrap 20 is disposed adjacent to the outer surface 8 of the liner 4. The composite wrap 20 generally provides additional structural support to the pressure vessel 2, particularly in combination with the liner 4. The composite wrap 20 can be formed from various composite materials including, as non-limiting examples, plastic composites, glass composites, carbon composites, and combinations thereof.

The composite materials forming the composite wrap 20 are generally fibrous and form a plurality of composite layers 21. The composite layers 21 include, as non-limiting examples, glass fibers, polymeric fibers, and carbon or graphite fibers impregnated or coated with a plastic material. The fibers include chopped fiber, directional fiber, woven fiber, and knitted fiber fabric. Suitable carbon fibers are commercially available, for example, as T700™ from Toray Industries Inc. Suitable plastic materials include, as nonlimiting examples, thermosetting resins such as epoxy or modified-epoxy resins. One of ordinary skill should understand that other plastic materials can also be employed in the composite wraps 20 as desired. For example, the composite material includes a fiber impregnated with a thermoplastic material having desired characteristics. The composite material can be prepared by conventional processes as known in the art. In particular embodiments, the composite wrap 20 includes carbon fibers impregnated with an epoxy resin. In a further embodiment, the composite wrap 20 includes carbon fiber in an amount of about 60 percent and epoxy resin in an amount of about 40 percent by volume of the total composite material.

The composite wrap 20 of the present invention has a modulus gradient wherein the stiffness or elastic modulus of the composite wrap 20 increases across a thickness 22 of the composite wrap 20. In a particular embodiment of the invention, the modulus gradient is a gradient in strain modulus. The modulus gradient compensates for any stress shielding of the composite wrap 20 due to the thick wall effect. As a nonlimiting example, the modulus gradient can include a substantially continuous increase in modulus. In a particular embodiment, the modulus gradient includes a plurality of discrete steps of increasing elastic modulus through the composite wrap 20. The modulus gradient can be selected as desired by one of ordinary skill in the art to militate against a thick wall effect in the composite wrap 20 of the pressure vessel 2.

In one embodiment, the composite wrap 20 includes the plurality of composite wrap layers 21 that form the modulus gradient by providing the plurality of discrete modulus steps. As a nonlimiting example, the composite wrap 20 includes a first composite wrap layer 24 and a second composite wrap layer 26. The first composite wrap layer 24 is disposed between the second composite wrap layer 26 and the outer surface 8 of the liner 4. The first composite wrap layer 24 typically has a strain modulus lower than a strain modulus of the second composite wrap layer 26, thereby forming the modulus gradient with one discrete step across the thickness 22 of the composite wrap 20. However, the second composite wrap layer 26 can have a higher strain modulus if desired.

In the embodiment depicted in FIGS. 1 and 2, the composite wrap 20 further includes a third composite wrap layer 28. The strain modulus of the third composite wrap layer 28 is typically greater than the strain moduli of the first and second composite layers 24, 26. Thus, a modulus gradient having two discrete steps in strain modulus across the thickness 22 of the composite wrap 20 is shown.

It should be understood that that the plurality of composite wrap layers 21 are selected so that they each reach a breaking load or a peak tensile stress at substantially the same pressure during operation of the pressure vessel 2. However, other loads or stresses can be used.

In a particular embodiment of the present invention, a pressure vessel 2 includes the liner 4 that forms the cavity 10 and has the inner surface 6 and the outer surface 8. The pressure vessel 2 further includes a composite wrap 20 disposed adjacent to the outer surface 8 of the liner 4. The composite wrap 20 comprises the plurality of composite layers 21, wherein the plurality of composite layers 21 includes the first composite layer 24 and the second composite layer 26. The first composite layer 24 is disposed between the outer surface 8 of the liner 4 and the second composite layer 26. The first composite layer 24 also exhibits a lower strain modulus than does the second composite layer 26. The pressure vessel 2 is adapted to have a substantially uniform stress distribution across the thickness 22 of the composite wrap 20 when the pressure vessel 2 is charged with the compressed fuel 18 and a pressure is applied to the inner surface 6 of the liner 4.

A method for manufacturing the pressure vessel 2 of the disclosure includes providing the liner 4 that forms the cavity 10 and has the outer surface 8. The method further includes providing the composite wrap 20 having the plurality of composite wrap layers 21, wherein each of the composite wrap layers 21 has a different strain modulus. The plurality of composite wrap layers 21 are wrapped on the outer surface 8 of the liner 4 to form the composite wrap 20 having the modulus gradient.

One of ordinary skill in the art should appreciate that the wrapping of the composite wrap 20 onto the liner 4 can be conducted according to any technique known in the art. Illustratively, a fibrous strand (e.g. a filament, roving, yarn, or fiber tape) is wetted with a plastic resin and wound onto the outer surface 8 of the liner 4 to form a substantially uniform overlay of the composite wrap 20. This step may be carried out, for example, by mounting the liner 4 onto a mandrel and rotating the liner 4 while methodically feeding the strand from a laterally and reciprocally traversing source. This step can be continued or repeated until the composite wrap 20 or the plurality of composite wrap layers 21 have reached the desired thickness 22. The strands may be wound cold onto the liner 4, or may be passed through a heater which, in some applications, can result in an optimum uniformity.

In performing the method of the invention, the fibrous strand can be impregnated with the suitable plastic material before being applied to the liner 4. Alternatively, the composite fibers can be impregnated at the same time they are applied onto the liner 4 by drawing them through a liquid resin bath, for example. The plastic material can also be applied after the winding of the fibers has been performed.

Winding patterns suitable for wrapping the liner 4 with the composite wrap 20 of the present disclosure can be found, for example, in U.S. Pat. No. 3,282,757 to Brussee, incorporated herein by reference in its entirety. As a nonlimiting example, wrapping patterns include helical patterns generated by wrapping the strand at an angle relative to a longitudinal axis of the pressure vessel 2. The wrapping includes winding the strand from the first end 12 to the second end 14 of the pressure vessel 2. The lengthwise passes of the strands are desirably applied side-by-side and substantially envelope the liner 4 with the composite wrap 20. Wrapping patterns can also include circumferential or hoop wrapping of the liner 4 at an angle substantially perpendicular to the longitudinal axis of the pressure vessel 2. It should be appreciated that alternative winding patterns can also be used as desired.

In particular embodiments, the wrapping of the composite wrap 20 onto the liner 4 includes winding with one or more rovings or untwisted bundles of continuous filaments, thereby forming the plurality of composite wrap layers 21. The winding of the rovings can be conducted sequentially or simultaneously with one or more materials to provide different strain moduli, for example. As a nonlimiting example, the wrapping of the composite wrap 20 can include a simultaneous winding of 2 to 4 rovings of a suitable composite material. Illustratively, the rovings are carbon fiber rovings having between about 20,000 and about 36,000 filaments. In one embodiment, the rovings are carbon fiber and include about 24,000 filaments per roving. Other wrappings can be used as desired.

The method of the present invention also includes wrapping the outer surface 8 with the first layer of the composite wrap 24, and wrapping the first composite layer wrap 24 with the second composite layer wrap 26. It should be understood that the second composite layer wrap 26 has a greater strain modulus than the first composite layer wrap 24, thereby providing the composite wrap 20 with the desired modulus gradient.

In certain embodiments, the method for manufacturing the pressure vessel 2 includes the step of applying a pretension to the second composite layer wrap 26. As should be understood, the pretension in the second composite layer wrap 26 allows for a transfer of stress from the first composite layer wrap 24 disposed adjacent to the liner 4. Pretension can be used in conjunction with the modulus gradient to more evenly distribute the tensile stress resulting from the pressure on the liner 4 when the pressure vessel 2 is charged. Thus, the pretension of the composite layer 2 further militates against the thick wall effect in the charged pressure vessels 2 of the invention.

The present method may also include a step of curing the pressure vessel 2 following a wrapping of the liner 4 with the composite wrap 20, particularly when the composite wrap 20 includes fibers impregnated with a curable resin, for example, an epoxy resin. Curing can be performed according to any of the know techniques of the art. The method can further include a step of cooling the pressure vessel 2 following a curing of the pressure vessel 2. The pressure vessel 2 is cooled following a high temperature application of the composite wrap 20 to the pressure vessel 2.

It should be appreciated that the materials forming the composite wrap 20 can be chosen to achieve a desired strain modulus for the various composite layers 21 of the composite wrap 20. In particular, the composite wrap 20 is adapted to have a substantially uniform stress across the thickness 22 of the composite wrap 20 when pressure is applied to the inner surface 6 of the liner 4, for example when the cavity 10 of the pressure vessel 2 is filled with the compressed fuel 18, such as hydrogen gas.

In operation, the composite wrap 20 of the present invention is adapted to reach a peak tensile stress wherein the various composite layers 21 rupture or break. The peak tensile stress is generally achieved when a desired maximum pressure is applied to the inner surface 6 of the liner 4. One of ordinary skill in the art should further understand that the materials and the pretension for the composite wrap 20 can be chosen so that the peak tensile stresses of the various composite layers 21 are achieved substantially simultaneously. Accordingly, due to the modulus gradient across the thickness 22 of the composite wrap 20, the thick wall effect typically observed in pressure vessels of the art is militated against by the present invention. The composite wrap 20 having the desired modulus gradient can be more efficiently and effectively employed. Additionally, as a nonlimiting example, an amount of the material forming the composite wrap 20 can be optimized to provide substantially the same performance at a minimum volume and mass of material.

The compressed fuel 18 in a pressure vessel 2 of the present disclosure can be utilized in a fuel cell propulsion system as a source of power for a vehicle, for example, an automobile. In particular, the pressure vessel 2 can be configured to deliver the compressed fuel 18, e.g. hydrogen gas, to a fuel cell system having a fuel cell stack with a plurality of fuel cells. Alternative compressed fuels also suitable for use in fuel cells can similarly be supplied by the pressure vessel 2 to a fuel cell system adapted to receive said alternative fuels.

While certain representative embodiments and details have been shown for purposes of illustrating the invention, it will be apparent to those skilled in the art that various changes may be made without departing from the scope of the disclosure, which is further described in the following appended claims.

What is claimed is:

1. A pressure vessel comprising:
   a liner forming a cavity and having an inner surface and an outer surface; and
   a composite wrap including a plurality of composite layers disposed adjacent to the outer surface, the plurality of composite layers including a first composite layer, a second composite layer, and a third composite layer, the first composite layer disposed between the second composite layer and the outer surface of the liner, the second composite layer disposed between the first composite layer and the third composite layer, the first composite layer, the second composite layer, and the third composite layer wrapped together and defining a thickness of the composite wrap, the composite wrap having a desired strain modulus gradient across the thickness of the composite wrap,
   wherein the first composite layer has a lower strain modulus than the second composite layer, and the second composite layer has a lower strain modulus than the third composite layer,
   wherein each of the first composite layer, the second composite layer, and the third composite layer reach a peak tensile stress substantially simultaneously at substantially the same pressure during operation of the pressure vessel, the same pressure applied to the inner surface of the liner by a compressed fluid disposed in the cavity of the pressure vessel, and
   wherein a thick wall effect is militated against when the cavity is pressurized with the compressed fluid.

2. The pressure vessel of claim 1, wherein the plurality of composite layers is adapted to reach the peak tensile stress when a maximum pressure is applied to the inner surface of the liner.

3. The pressure vessel of claim 1, wherein the liner is formed from one of a metal and a polymer.

4. The pressure vessel of claim 3, wherein the metal is selected from the group consisting of steel, aluminum, titanium, copper, zinc and alloys thereof.

5. The pressure vessel of claim 3, wherein the polymer is a plastic selected from the group consisting of polypropylene, polyethylene, polybutylene terephthalate, polyethylene terephthalate, and combinations thereof.

6. The pressure vessel of claim 1, wherein at least one of the plurality of composite layers includes at least one fiber impregnated with at least one plastic material.

7. The pressure vessel of claim 6, wherein the fiber is selected from the group consisting of polyester fibers, glass fibers, aramid fibers, boron fibers, carbon fibers, and combinations thereof.

8. The pressure vessel of claim 1, wherein the plurality of composite layers includes from about 1 to about 4 rovings.

9. The pressure vessel of claim 8, wherein the rovings include between about 20,000 and about 36,000 filaments.

* * * * *